United States Patent [19]

Brandenburg

[11] 4,360,284
[45] Nov. 23, 1982

[54] BALL-JOINT ASSEMBLY

[75] Inventor: Darrell L. Brandenburg, Anderson, Ind.

[73] Assignee: General Motors Corporation, Detroit, Mich.

[21] Appl. No.: 195,193

[22] Filed: Oct. 8, 1980

[51] Int. Cl.³ .......................... F16C 11/00; F16D 1/12
[52] U.S. Cl. .................................... 403/133; 403/135; 403/142; 403/140; 403/227
[58] Field of Search ............... 403/135, 140, 142, 143, 403/133, 122, 131, 132, 138, 140, 144, 129, 130, 225, 226, 227

[56] References Cited

U.S. PATENT DOCUMENTS

| 2,443,712 | 6/1948 | Alldredge | 403/138 X |
| 3,699,580 | 10/1972 | Joseph et al. | 403/135 X |
| 4,059,361 | 11/1977 | Allison | 403/138 X |

FOREIGN PATENT DOCUMENTS 2913700 10/1980 Fed. Rep. of Germany ...... 403/135

Primary Examiner—Wayne L. Shedd
Attorney, Agent, or Firm—Edward J. Biskup

[57] ABSTRACT

A ball-joint assembly having a two-part hinged plastic bearing member adapted to be positioned about the ball portion of a ball-stud member and be placed within an aperture formed in a link having a plurality of upstanding tabs which are adapted to be bent over for maintaining the ball-stud member and bearing member in the end of the link.

2 Claims, 6 Drawing Figures

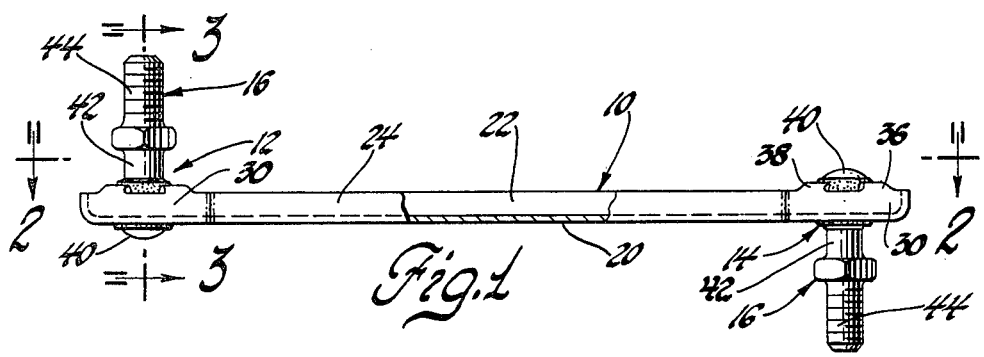
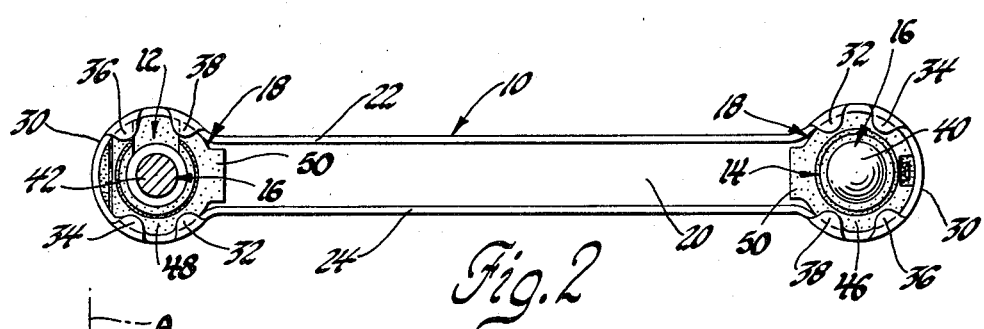
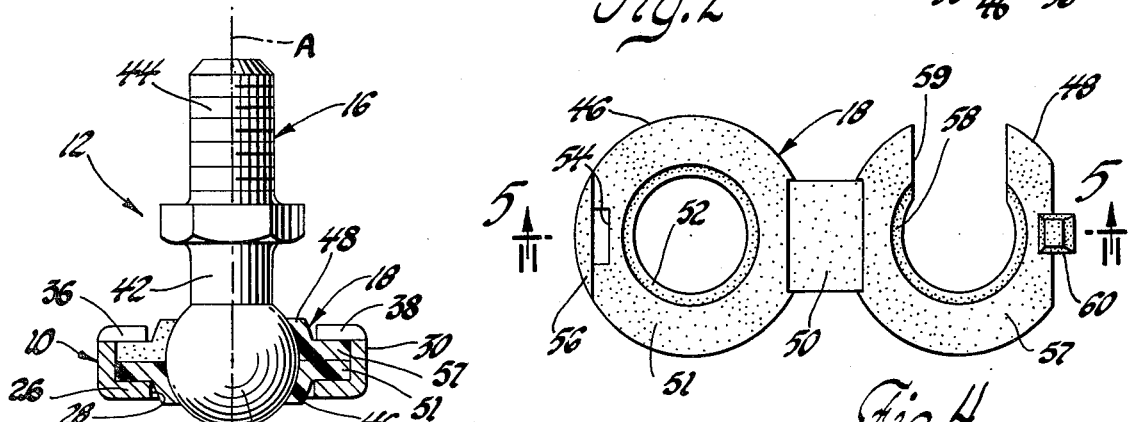
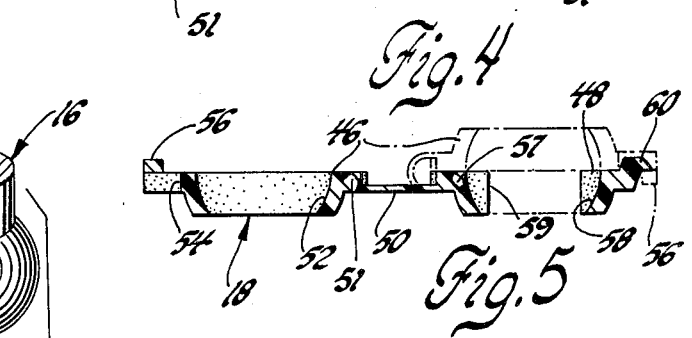
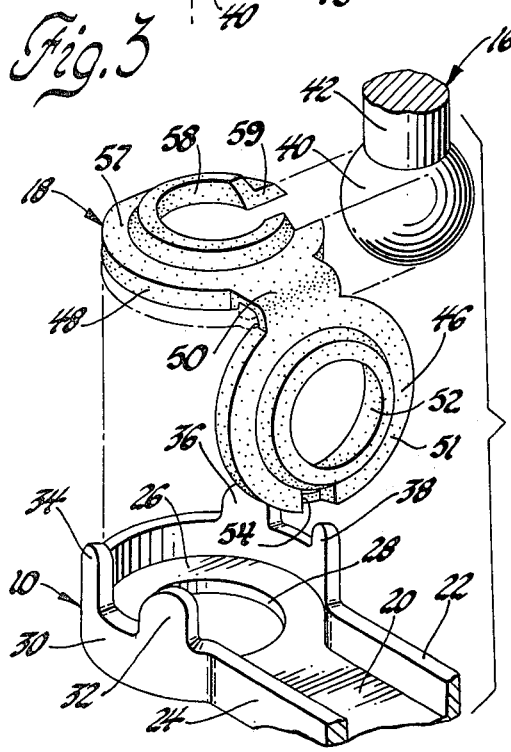

BALL-JOINT ASSEMBLY

This invention concerns ball-joint assemblies of the type which interconnect a ball-stud member to a link and provide universal pivotal movement therebetween.

More specifically, the ball-joint assembly according to the present invention includes a bearing member made of a plastic material mounted on the ball portion of a ball-stud member and, together with the ball-stud member, is supported within an aperture in a link. The link has a plurality of tabs surrounding the aperture that are adapted to be bent over for maintaining the ball-stud member and the bearing member in the aperture. The bearing member includes a pair of spaced socket portions, each of which is formed with a spherical bearing surface. A flexible web is integrally formed with each of the socket portions and serves as a hinge which interconnects the socket portions and permits them to be coaxially aligned with the ball portion of the ball-stud member located between the spherical bearing surfaces. In addition, the link is formed with means which engage a portion of the flexible web and serve as a stop for limiting relating relative movement between the bearing member and the link.

The objects of the present invention are: to provide a new and improved ball-joint assembly for interconnecting a ball-stud member to a link and providing relative universal pivotal movement therebetween; to provide a new and improved ball-joint assembly having a plastic bearing member that is formed with two socket portions which are interconnected by an integral web that hinges the socket portions together and permits them to be coaxially aligned and locked together for maintaining the ball portion of a ball-stud member therebetween; to provide a new and improved ball-joint assembly having a plastic bearing member which is formed as a single unit with two interconnected socket portions that are located side-by-side and are movable relative to each other into abutting relationship for supporting the ball portion of a ball-stud member therebetween; to provide a new and improved ball-joint assembly including a link supporting a ball-stud member and bearing member formed with two socket portions interconnected by an integral web which cooperates with means formed on the link for limiting rotational movement between the bearing member and the link about the longitudinal axis of the ball-stud member; and to provide a new and improved ball-joint assembly which includes a molded plastic bearing member formed with two opposed spherical bearing surfaces which are hinged together by a flexible web.

Other objects and advantages of the present invention will be apparent from the following detailed description when taken in conjunction with the accompanying drawings in which:

FIG. 1 is a side elevational view of a link employing two identical ball-joint assemblies, each of which is made in accordance with the present invention;

FIG. 2 is a plan view taken on line 2—2 of FIG. 1;

FIG. 3 is an enlarged sectional view taken on line 3—3 of FIG. 1;

FIG. 4 is an enlarged plan view of the bearing member incorporated in each of the ball-joint assemblies shown in FIGS. 1 and 2;

FIG. 5 is a sectional view taken on line 5—5 of FIG. 4; and

FIG. 6 is an exploded view showing the several parts of the ball-joint assembly incorporated in each end of the link shown in FIGS. 1 and 2.

Referring to the drawings and, more particularly to FIGS. 1 and 2 thereof, an elongated link 10 is shown incorporating a pair of identical ball-joint assemblies 12 and 14 made in accordance with the present invention, one of which is located at one end of the link 10 and the other of which is located at the other end of the link 10. As seen in FIG. 3, each ball-joint assembly 12 and 14 comprises a ball-stud member 16 and a bearing member 18 which is made of resilient plastic material, such as polyacetal or nylon.

As seen in FIGS. 1 and 2, the link 10 is made from sheet metal and comprises an elongated base plate portion 20 which is integrally formed with laterally spaced side walls 22 and 24. Each end of the base plate portion 20 is identically formed and comprises a circular portion 26 formed with a concentric circular aperture 28 which (as seen in FIG. 6) is surrounded by an arcuate wall 30 integral with the side walls 22 and 24. The arcuate wall 30 has four upstanding tabs 32, 34, 36, and 38, which are adapted to be bent radially inwardly for retaining the ball-stud member 16 and bearing member 18 in position, as will be more fully explained hereinafter.

The ball-stud member 16 has one end thereof provided with a spherical ball 40 which is connected through a reduced-diameter neck portion 42 to a shank 44 which is threaded and extends axially from the neck portion 42. As is conventional, the ball-stud member 16 is preferably formed of steel, with the spherical ball 40 being case-hardened.

As seen in FIGS. 4 through 6, the bearing member 18 comprises a pair of socket portions 46 and 48 that are interconnected through web 50 which is integral with each of the socket portions 46 and 48 and serves as a hinge. The socket portion 46 takes the form of a ring having a depending circular wall 51, the inner surface of which is formed as a spherical bearing surface 52 that is adapted to receive a part of the ball 40 of the ball-stud member 16. A rectangular aperture 54 is formed in the socket portion 46 adjacent to a crescent-shaped projection 56 integral with the socket portion 46.

Similarly, the socket portion 48 takes the form of a ring having a depending circular wall 57, the inner surface of which is formed as a spherical bearing surface 58 which also receives a part of the ball 40 of the ball-stud member 16, as will be more fully explained hereinafter. The socket portion 48 has a cut-out portion 59 and, in addition, is integrally formed with a locking tab 60 which cooperates with the aperture 54 in socket portion 46 for locking the socket portions 46 and 48 together.

As seen in FIG. 6, prior to placing the ball-stud member 16 and bearing member 18 in one end of the link 10, the neck portion 42 of the ball-stud member 16 is moved through the cut-out portion 59 of socket portion 48 so that a part of the ball 40 adjacent the neck portion 42 engages the spherical bearing surface 58. Afterwards, the socket portion 46 is moved about the web 50 towards socket portion 48, causing the locking tab 60 to extend through the aperture 54 and thereby lock the socket portions 46 and 48 together—as seen in phantom lines in FIG. 5, with the spherical surfaces 52 and 58 thereof in engagement with the ball 40. The combined bearing member 18 and ball-stud member 16 are then positioned in one end of the link 10 in axial alignment with the circular aperture 28 formed therein, and with the outer surface of the socket portion 46 being in contact with the circular portion 26 of the base plate portion 20 and a portion of the ball 40 extending through the circular aperture 28. The tabs 32, 34, 36, and 38 are then bent radially inwardly towards the ball-stud member 16 and into engagement with the socket portion 48 to retain the bearing member 18 in position within the link 10. As seen in FIG. 2, once the combined ball-stud member 16 and bearing member 18 are located within the link 10, the folded web 50 of the bearing member 18 that joins the socket portions 46 and 48 extends between the side walls 22 and 24 of the link 10 so that the side walls 22 and 24 serve as a stop for limiting relative movement between the bearing member 18 and the link 10 about the longitudinal center axis "A" of the ball-stud member 16, as seen in FIG. 3.

Various changes and modifications can be made in this construction without departing from the spirit of the invention. Such changes and modifications are contemplated by the inventor, and he does not wish to be limited except by the scope of the appended claims.

The embodiments of the invention in which an exclusive property or privilege is claimed are defined as follows:

1. A ball-joint assembly including a bearing member for connecting a ball-stud member to a link and providing relative pivotal movement therebetween, said ball-stud member including a ball portion integrally connected to a neck portion, said link comprising a base plate portion which is formed with a plurality of tabs bent over for maintaining said bearing member in engagement with said base plate portion, said bearing member comprising a first socket portion formed with a first spherical bearing surface, a second socket portion formed with a second spherical bearing surface and having a cut-out portion for receiving said neck portion of said ball-stud member during assembly of said ball-stud member and said bearing member; a flexible web connecting said first and second socket portions and serving as a hinge for permitting said first and second socket portions to be coaxially aligned with said ball portion of said ball-stud member located between said first and second spherical bearing surfaces; and means formed with said base plate portion and cooperating with said flexible web for limiting relative movement between said bearing member and said link about the longitudinal axis of said ball-stud member.

2. A ball-joint assembly including a bearing member for connecting a ball-stud member to a link and providing relative pivotal movement therebetween, said ball-stud member including a ball portion integrally connected to a neck portion, said link having an aperture formed therein surrounded by a plurality of tabs bent over for maintaining said ball-stud member and said bearing member in said aperture, said bearing member comprising a first ring-shaped socket portion formed with a first spherical bearing surface, a second ring-shaped socket portion formed with a second spherical bearing surface and having a cut-out portion; a flexible web connecting said first and second socket portions and serving as a hinge for permitting said first and second socket portions to be coaxially aligned with said ball portion of said ball-stud member located between said first and second spherical bearing surfaces; and a pair of laterally spaced side walls formed with said link and cooperating with said flexible web for limiting relative movement between said bearing member and said link about the longitudinal axis of said ball-stud member.

* * * * *